May 3, 1966 R. D. CURRIER 3,249,329
CONTAINER HOLDDOWN DEVICE
Filed June 22, 1964 2 Sheets-Sheet 1

INVENTOR
RICHARD D. CURRIER
BY
Kenway, Jenney + Hildreth
ATTORNEYS

May 3, 1966  R. D. CURRIER  3,249,329
CONTAINER HOLDDOWN DEVICE
Filed June 22, 1964  2 Sheets-Sheet 2

INVENTOR
RICHARD D. CURRIER
BY
Kenway, Jenney & Hildreth
ATTORNEYS

United States Patent Office 3,249,329
Patented May 3, 1966

3,249,329
CONTAINER HOLDDOWN DEVICE
Richard D. Currier, 20 Willowbrook Ave.,
Greenland, N.H.
Filed June 22, 1964, Ser. No. 376,834
4 Claims. (Cl. 248—119)

This invention relates generally to holddown devices, and more particularly to holddown devices for use in delivery vehicles to secure flowers, plants or other fragile articles for transport.

It is commonly accepted practice, for example, for florists to use small panel trucks or similar vehicles for carrying their floral displays and plants from greenhouses and wholesale markets to the florist's shop and from thence to the destination desired by the customer. Trucks of the type normally used are fitted with a metal truck bed, often in the form of corrugated sheet metal. Flower pots, floral displays in baskets or vases, and potted plants are normally placed on this truck bed for transport. This method of transport often presents a serious problem, however, in that the flowers or plants overturn during delivery.

To prevent such overturning and the resulting damage to the floral display or plant several partially successful solutions have been offered. In some instances cardboard cartons are first placed on the truck bed and the plant or floral display is then placed within the carton and packed with newspaper or other paper material to prevent overturning. The carton must of course be repacked each time it is used and is itself free to slide on the truck bed. Others have used a frame having a plurality of apertures for receiving flower pots positioned in the truck and spaced slightly above the bed. With this structure, flower pots may be held by positioning them within a selected aperture in the frame. This construction is generally satisfactory where a few standard size flower pots are usually employed. Since containers of many different sizes are likely to be transported by the average florist, however, supporting frames of this type are not generally favored. The frames are particularly useless where floral displays are transported in containers other than conventional flower pots, as for example in baskets or different shaped vases, since these containers may not fit within the apertures in the supporting frame.

The most important object of this invention is to prevent damage to flowers and plants or other fragile articles being delivered in trucks.

Another object of this invention is to reduce losses to shippers resulting from transit damage to fragile products, particularly those products which by their nature cannot efficiently be packed for shipment in containers providing inherent stability against road shocks and accelerations.

A further object of this invention is to provide a holddown device of relatively simple and inexpensive construction adaptable to receive flower pots, vases and the like, of widely differing dimensions and configurations, and to hold them securely against relative movement with respect to the truck bed.

In the practice of the invention in a preferred embodiment thereof, a holddown device is constructed having a platform or base adapted to receive a container. A plurality of spring-loaded holddown cords are mounted on the base and are provided with terminal hooks for connection to the container. The holddown cords are long enough to serve containers of varying dimensions. The base includes means for simultaneously locking the several holddown cords against further extension so that the container is rigidly held upon the platform.

The bottom of the platform is provided with several feet in the form of magnets of sufficient strength to hold the platform rigidly upon the truck bed, whether the bed be flat sheet metal or corrugated metal.

A rigid connection is thus established between the truck bed and the container to prevent overturning of the container during transit with subsequent damage to the fragile contents.

It is a feature of this invention that an easily operated mechanism is employed for simultaneously locking all the holddown cords to insure that the container will remain rigidly mounted on the platform.

A further feature of the invention is that a single style and size holddown device may be satisfactorily used to secure any of a plurality of different shaped containers, including containers which actually have wider bases than the holddown device.

These and other objects and features of the invention will be more readily understood and appreciated from the following detailed description of a preferred embodiment thereof selected for purposes of illustration and shown in the accompanying drawings, in which.

Figure 1:
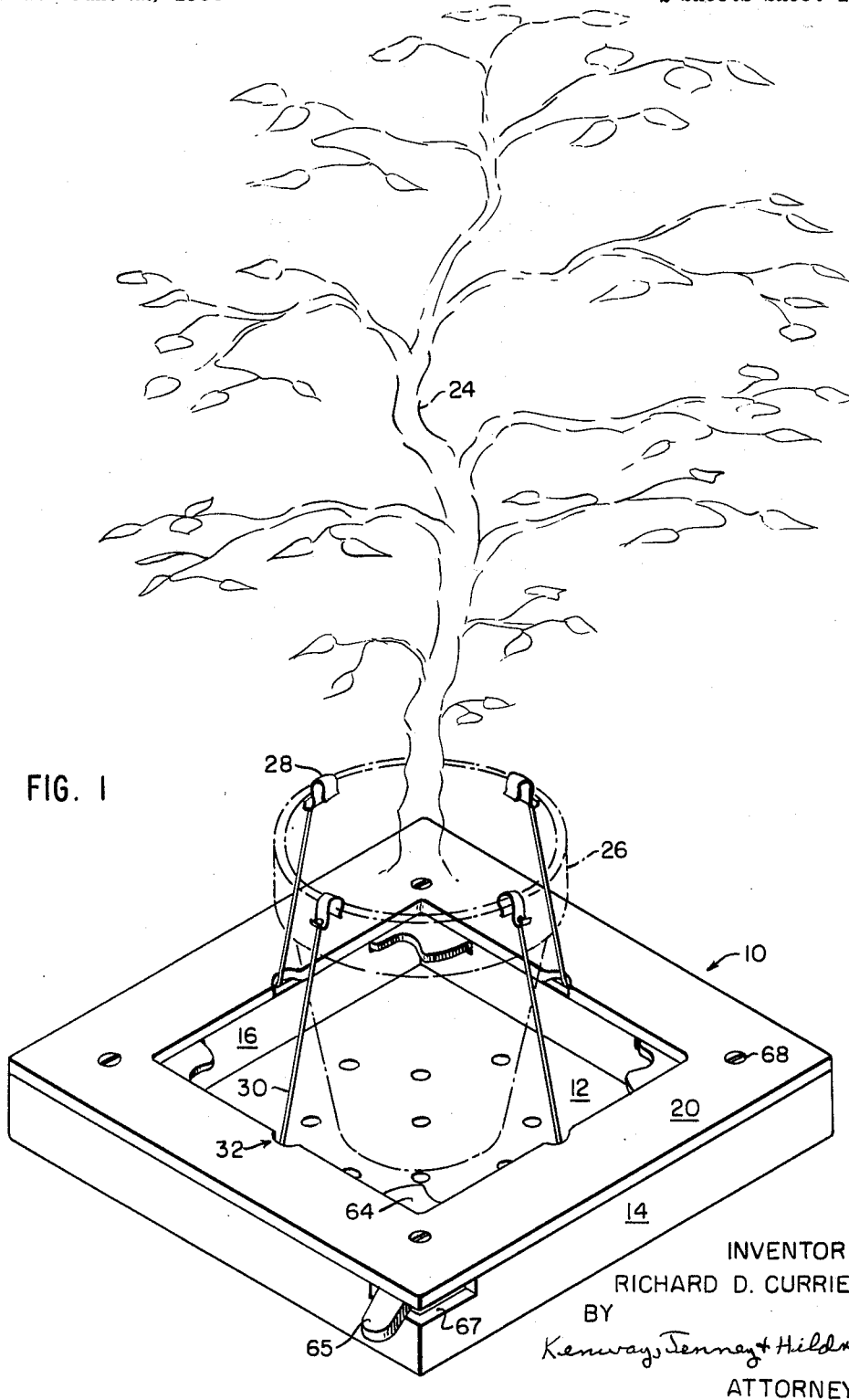
FIG. 1 is a view in perspective of a holddown device according to the invention shown securing a plant for transport.
Figure 2:
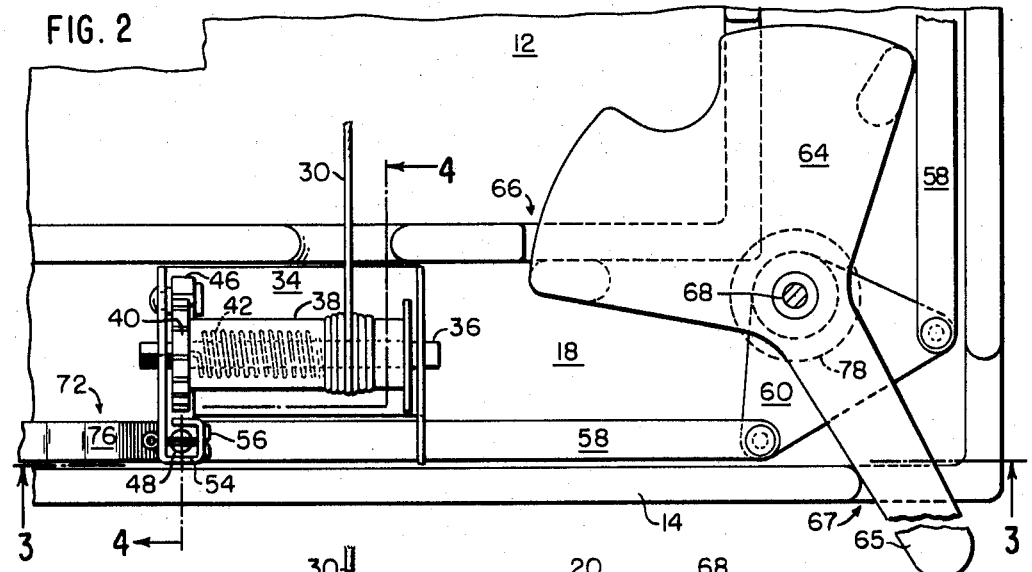
FIG. 2 is a fragmentary plan view of the holddown device of FIG. 1 with the cover removed.

A holddown device constructed in accordance with the invention is indicated generally at 10 in FIG. 1. The device 10 includes a bottom platform or base 12 of generally square configuration which mounts four exterior side walls 14 and four interior side walls 16 forming in combination a channel indicated generally at 18 (as seen in FIG. 2) about the periphery of the bottom 12. A top cover 20 is provided to fit on top of the peripheral channel 18. Drain holes are also provided through the bottom 12.

Referring to FIG. 1, a plant 24 in a flower pot 26 is placed on the holddown device 10. The flower pot 26 rests upon the bottom 12 and is engaged by four hooks 28 about its upper rim. Each hook 28 is attached to a holddown cord 30 which extends from the interior of the peripheral channel 18 through a hole 32 in the cover 20.

Figure 3:
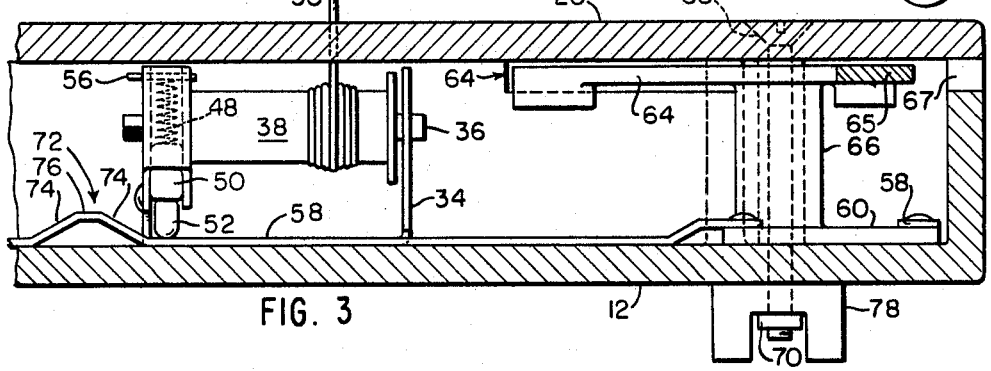
FIG. 3 is a section taken on the line 3—3 of FIG. 2 showing a portion of the device in side view.
Figure 4:
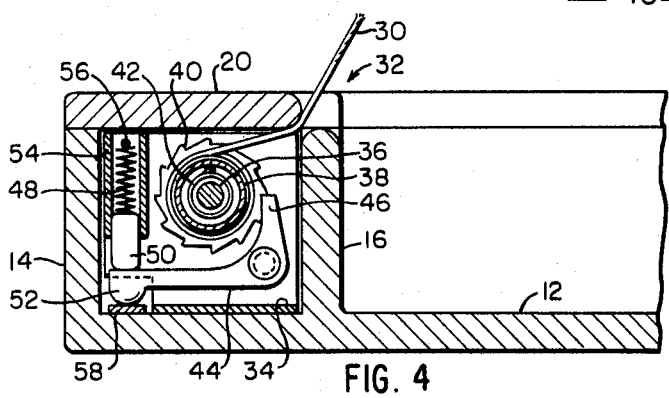
FIG. 4 is a section taken on the line 4—4 of FIG. 2 showing a portion of the device in end section.

The device for operating the holddown cords 30 is the same for each cord, and consequently only the device for one cord is illustrated in detail in FIGS. 2 through 4.

As shown in FIGS. 2 through 4, secured to the bottom of the channel 18 is a U-shaped bracket 34 in the legs of which there is fixed a shaft 36 restrained against rotation by square ends which are received in square holes cut in the legs of the bracket 34. A drum 38, about which is wound the free end of the associated holddown cord 30, is mounted for rotation on the shaft 36. A ratchet wheel 40 forms one end of the drum 38. The entire drum assembly is spring loaded to rotate counter-clockwise as seen in FIG. 4 by means of a coiled spring 42 positioned about the shaft 36 having one of its ends attached to the ratchet wheel 40 and its other end attached to the shaft 36. The holddown cord 30 is initially wound on the drum 38 with the spring 42 in relaxed condition in order that subsequent unwinding of the holddown cord 30 will rotate the drum 38 in a clockwise direction and impart a tension to the spring 42 which will cause the drum 38 to rewind the holddown cord 30 when it is released.

In order to control the winding and unwinding of the holddown cord 30 a bell crank 44 is pivotally mounted to the leg of the frame 34 adjacent the ratchet wheel 40.

One leg of the bell crank 44 serves as a detent 46 which may be moved into and out of engagement with the ratchet wheel 40. The bell crank 44 is initially positioned with respect to the ratchet wheel 40 such that with the detent 46 engaged, the ratchet wheel 40 and the drum 36 may freely rotate to wind up the holddown cord 30, but may not rotate in the opposite direction to permit its unwinding. The detent 46 is normally maintained in engaged position through the operation of a coiled spring 48 which acts through a piston 50 against the upper surface of a leg 52 of the bell crank 44. The spring 48 resides in a housing 54 formed on the bracket 34 and is kept within the housing 54 by a cotter pin 56 which passes through the housing 54 above it.

The detent 46 is released from its engaged position to permit unwinding of the holddown cord 30 by the application of an upward force to the undersurface of the leg 52 of the bell crank 44. This is accomplished by means of a linkage system positioned in the bottom of the channel 18 which includes a link 58 positioned adjacent the interior surface of each of the exterior side walls 14. The adjacent ends of each pair of links 58 are pivotally connected to the opposed legs of a bell crank 60, one of which is pivotally positioned at each corner of the peripheral channel 18. The bell crank 60 includes an upstanding tubular shaft 66 and an operating lever 64 positioned at the top of the shaft 62 extending outwardly through a hole 66 at the junction of the adjacent pair of interior side walls 16. The lever 64 may also have an extension 65, as seen in FIG. 2, which extends outwardly through a hole 67 at the junction of the adjacent pair of exterior side walls 14. The bell crank 60 and control lever 64 are pivotally positioned within the channel 18 by means of a screw 68 which passes through the bottom 12 and the cover 20 as well as the shaft 62. The screw 68 is fitted with a cooperating nut 70 and additionally serves to hold the cover 20 on top of the channel 18.

It will thus be noted that partial rotation of the lever 64 about its pivot will cause similar rotation of the bell crank 60 and associated lateral shifting of the entire linkage system including the links 58. This motion is utilized to disengage the several detents 46. A wedge portion 72 is formed on each link 58 and includes a pair of inclined, converging surfaces 74 joined by a flat top surface 76 at a point above the plane of the link 58. As is best seen in FIG. 3, the link 58 is positioned in the channel 18 passing through the U-shaped bracket 34 which is cutaway to receive it. The undersurface of the leg 52 of the bell crank 44 normally rides upon the upper surface of the link 58. When the link 58 is shifted laterally by movement of the lever 64, the wedge portion of the link 58 is moved under the leg 52 and applies a lifting force thereto in opposition to the downward force applied to the leg 52 by the spring 48. The bell crank 44 is thus caused to pivot and to disengage the detent 46 from the ratchet wheel 40. The detent 46 is held in disengaged position when the leg 52 rests upon the raised top surface 76 of the wedge portion 72. It will thus be observed that by shifting of the links 58 through operation of one of the levers 64 the detents 46 associated with each of the drums 38 may be simultaneously shifted between engaged and disengaged condition. When the detents 46 are disengaged the drums 38 are free to rotate to allow the associted holddown cords 30 to be withdrawn from within the channel 18 and engaged to the container to be secured.

The novel means which are provided for securing the device 10 to the truck bed comprise a plurality of feet 78 in the form of permanent magnets which are mounted to the undersurface of the bottom 12 surrounding each of the screws 68 and are held thereon by the associated nuts 70. It will be noted that four such magnetic feet 78 are provided in the illustrated preferred embodiment. The feet 78 extend downwardly from the undersurface of the bottom 12 a sufficient distance to permit the device to be engaged on a corrugated metal surface.

The operation of the illustrated holddown device is as follows:

When the linkage system is shifted to disengage each of the detents 46 the several holddown cords 30 will be reeled in upon the associated drums 38, unless otherwise restrained, until the hooks 28 abut the outer surface of the cover 20. The container holding the fragile article, for example the flower pot 26 of FIG. 1, is placed on the bottom 12 and the holddown cords 30 are unwound sufficiently to enable the associated hooks 28 to be attached to a convenient portion of the container. Once the hooks 28 are in place one of the levers 64 is operated to shift the links 58 in order to re-engage the detents 46 with their associated ratchet wheels 40 thus preventing any further unwinding of the holddown cords 30. A continuing tension is supplied to the holddown cords 30, however, through the coiled springs 42 which still tend to rotate the associated drums 38 to wind in the holddown cords 30.

The entire device is then carried to the delivery truck where it is placed upon the metal bed and rigidly held thereon by the magnetic feet 78. The permanent magnets which comprise the feet 78 are initially selected of a strength which permits the device to be subsequently disengaged from the truck bed upon the application of a reasonable lifting force. It will be noted that the container is in condition for safe transit being rigidly supported within the device 10 which in turn is rigdly supported upon the metal truck bed.

When it is desired to release the container from the device 10 it is only necessary to again operate one of the levers 64 to disengage the several detents 46 from the associated ratchet wheels 40 which will permit further manual unwinding of the several holddown cords 30 allowing the hooks 28 to be disengaged from the container. The holddown cords 30 will be automatically rewound upon the associated drums 38 when released through the operation of the coiled springs 42.

It will thus be observed that a container holddown device is constructed which employs a platform having means for rigidly clamping a container thereon and which platform itself is provided with means whereby it may be rigidly secured to a metal truck bed.

It will further be noted that the novel mechanical arrangement for storage and tensioning of the several holddown cords and the linkage necessary for operating it may be inexpensively produced and may be easily installed in the channel 18 of the device since identical structure is employed at each of the sides thereof.

It will additionally be observed that a greater or lesser number of holddown cords may be employed. It has been discovered, however, that four holddown cords are most suitable for generally circular containers since use of only three cords requires very accurate spacing thereof exactly 120° apart in order to avoid applying unequal force to one half of the container. Provision of only two opposed holddown cords is unsatisfactory since the container is only restrained against tipping in the plane of the two cords and is completely free to tip in a plane normal thereto.

An additional advantage of the present construction resides in the fact that oversized or unusually shaped containers may be secured by the holddown device since the holddown cords may be hooked at any convenient portion of the container and may, if necessary, be brought out from beneath an oversized container and engaged at some available point thereon actually spaced further from the center of the bottom 12 than the holes 32 out of which the holddown cords 30 pass. When oversized articles are secured which prevent access to the several control levers 64 the extensions 65 thereof located at the exterior of the device may be operated to shift the linkage as desired. Although in the illustrated embodiment only one extension 65 is shown, it will be noted that each control lever 64 may be provided with an exterior extension 65 if desired. The number of control levers 64 may also be varied since the linkage can be operated by any one lever 64.

Having thus disclosed and illustrated a preferred embodiment of my invention it is my intention to claim all changes and modifications thereof within the spirit and scope of the appended claims.

What I claim as new and desire to secure by Letters Patent of the United States is:

1. In a holddown device including a base, magnetic means positioned on said base for releasably maintaining said base on a metal surface and a plurality of holddown cords, each of said cords having a hook for securing a container on said base; means associated with each of said holddown cords for releasably applying tension to said associated holddown cord to maintain said container securely on said base, said means comprising a U-shaped bracket mounted on said base having a pair of opposed upstanding legs, a drum rotatably journaled between said legs, a coiled spring operatively connected to said drum and to said bracket tending to rotate said drum in a first direction whereby said associated holddown cord will be wound about said drum, a ratchet wheel mounted on said drum for rotation therewith, a bell crank having a first leg comprising a detent for engagement with said ratchet wheel and a second leg, means pivotally mounting said bell crank on said bracket to pivot from a first position in which said detent engages said ratchet wheel to prevent rotation of said drum in a second direction opposed to said first direction to a second position in which said detent is disengaged from said ratchet wheel, a housing on said bracket, spring means mounted in said housing to apply a force to said second leg of said bell crank to maintain said detent in said first position and means mounted on said base operable to apply a dominating force to said second leg of said bell crank opposed to said force applied by said spring means to move said detent to said second position thereby permitting rotation of said drum in said second direction.

2. A holddown device as defined in claim 1 wherein said last mentioned means for applying a dominating force to said second leg of said bell crank opposed to said force applied by said spring means comprises a link mounted on said base for movement from a first position to a second position, a wedge portion on said link comprising a pair of upwardly converging surfaces and a top surface joining said converging surfaces above the plane of said link, said wedge portion being positioned on said link when in said first position adjacent said second leg of said bell crank whereby movement of said link to said second position will cause second leg of said bell crank to ride upwardly along one of said converging surfaces and rest upon said top surface thereof in opposition to the force applied to said second leg by said spring means.

3. A holddown device as defined in claim 2 further characterized by including linkage means whereby said links associated with said means associated with each of said holddown cords for releasably applying tension to said associated holddown cords are simultaneously moved from said first position to said second position including at least one operating lever connected to said linkage means and movable to shift said links between said first and said second positions.

4. A holddown device comprising a base comprising opposed side walls and a top cover forming an enclosure, and means for releasably securing a container upon said base, said last mentioned means including a plurality of holddown cords, a plurality of hooks secured each to one of said holddown cords for engaging a portion of a container, a plurality of drums connected each to one of said holddown cords for reeling said cord thereon, said drums being rotatably mounted within the enclosure of said base, a plurality of spring means secured to said base and connected in stressed relation each with one of said drums to continuously urge said drums in first directions of rotation to wind said holddown cords thereon, a plurality of ratchet wheels mounted each on one of said drums, detent means releasably engaging each of said ratchet wheels to prevent rotation of said drums in second directions of rotation opposed to said first directions, and means for disengaging said detent means from said ratchet wheels to permit rotation of said drums in said second directions against the bias of said spring means for unreeling of said cords from said drums.

References Cited by the Examiner
UNITED STATES PATENTS

| | | | |
|---|---|---|---|
| 1,758,873 | 5/1930 | Wickes | 248—361 |
| 2,260,932 | 10/1941 | Chulick et al. | 248—44 |
| 2,315,196 | 3/1943 | Gallione | 248—361 |
| 2,643,544 | 6/1953 | Chester. | |
| 2,665,824 | 1/1954 | Anderson. | |
| 3,077,791 | 2/1963 | Gray | 74—577 |

CLAUDE A. LE ROY, *Primary Examiner.*

J. PETO, *Assistant Examiner.*